(12) United States Patent
Czilwik et al.

(10) Patent No.: US 10,906,041 B2
(45) Date of Patent: Feb. 2, 2021

(54) FLUID HANDLING METHOD TO SWITCH A VALVE DEVICE OR TO TEMPORARILY COUNTERACT A FLOW

(71) Applicant: Hahn-Schickard-Gesellschaft fuer angewandte Forschung e.V., Villingen-Schwenningen (DE)

(72) Inventors: Gregor Czilwik, Muellheim (DE); Mark Keller, Freiburg (DE); Nils Paust, Freiburg im Breisgau (DE); Tobias Hutzenlaub, Herbolzheim (DE)

(73) Assignee: Hahn-Schickard-Gesellschaft fuer angewandte Forschung e.V., Villingen-Schwenningen (DE)

( * ) Notice: Subject to any disclaimer, the term of this patent is extended or adjusted under 35 U.S.C. 154(b) by 0 days.

(21) Appl. No.: 16/181,043

(22) Filed: Nov. 5, 2018

(65) Prior Publication Data

US 2019/0070607 A1    Mar. 7, 2019

Related U.S. Application Data

(63) Continuation of application No. PCT/EP2017/060075, filed on Apr. 27, 2017.

(30) Foreign Application Priority Data

May 6, 2016    (DE) .................. 10 2016 207 845

(51) Int. Cl.
*B01L 3/00*      (2006.01)
*B01F 13/00*     (2006.01)
*F16K 99/00*     (2006.01)

(52) U.S. Cl.
CPC .... *B01L 3/502723* (2013.01); *B01F 13/0079* (2013.01); *B01L 3/50273* (2013.01);
(Continued)

(58) Field of Classification Search
CPC .............. B01F 11/0002; B01F 11/0014; B01F 13/0059; B01F 15/0233; B01F 15/0201;
(Continued)

(56) References Cited

U.S. PATENT DOCUMENTS 7,819,138 B2 * 10/2010 Lee ...................... G05D 7/0694
                                                137/38
8,906,323 B2 * 12/2014 Momose ............. B01L 3/50273
                                                422/502

(Continued)

FOREIGN PATENT DOCUMENTS

CN        101850231 A      10/2010
CN        103167910 A       6/2013
(Continued)

OTHER PUBLICATIONS

Written opinion (Form 237) for PCT/EP2017/060075 dated Sep. 2017 (Year: 2017).*
(Continued)

*Primary Examiner* — Charles Cooley
(74) *Attorney, Agent, or Firm* — Michael A. Glenn; Perkins Coie LLP

(57) ABSTRACT

A fluid handling device has fluidic structures having inlet and outlet chambers and a connecting duct fluidically connecting the two. In a first state, the inlet chamber is completely or partly filled with at least a liquid and partly filled with a compressible medium, and the outlet chamber is at least partly filled with the compressible medium. One of the inlet chamber and the outlet chamber has such a venting duct that a flow resistance/volume product of venting of the chamber for the compressible medium amounts to at least 6700 N·s/m², the other of the inlet chamber and of the outlet chamber being vented. An actuator for actuating the fluidic structures is to cause a pressure difference of at least 30 Pa between the compressible media within the inlet and outlet
(Continued)

chambers, so as to thereby switch a valve device implemented into the connecting duct.

16 Claims, 9 Drawing Sheets

(52) U.S. Cl.
CPC ...... *F16K 99/0061* (2013.01); *F16K 99/0063* (2013.01); *B01L 2200/0621* (2013.01); *B01L 2400/0409* (2013.01); *B01L 2400/049* (2013.01); *B01L 2400/0442* (2013.01); *B01L 2400/0688* (2013.01); *B01L 2400/0694* (2013.01); *B01L 2400/084* (2013.01); *F16K 2099/0084* (2013.01)

(58) Field of Classification Search
CPC ........ B01F 13/0079; F04D 17/10; F04F 1/00; B01L 3/50273; B01L 2200/0621; B01L 2400/0442; B01L 2200/0684; B01L 2300/0803; B01L 2400/0409; B01L 3/502723; B01L 2400/0694; B01L 2400/049; B01L 2400/084; B01L 2400/0688; F16K 99/0063; F16K 99/0061; F16K 2099/0084
USPC ... 366/92–93, 130, 237, 341, DIG. 1–DIG. 4
See application file for complete search history.

(56) References Cited

U.S. PATENT DOCUMENTS

| | | | |
|---|---|---|---|
| 10,001,125 B2 * | 6/2018 | Paust | F04F 1/00 |
| 10,350,598 B2 * | 7/2019 | Schwemmer | B01L 3/502746 |
| 10,773,257 B2 * | 9/2020 | Paust | B01J 7/02 |
| 2006/0028908 A1 * | 2/2006 | Suriadi | B01F 13/0079 366/341 |
| 2006/0281192 A1 * | 12/2006 | Harding | B01F 13/0059 436/180 |
| 2008/0149190 A1 | 6/2008 | Bedingham et al. | |
| 2009/0104077 A1 * | 4/2009 | Momose | B01L 3/50273 422/72 |
| 2013/0243664 A1 | 9/2013 | Wuerl et al. | |
| 2014/0356129 A1 * | 12/2014 | Paust | F04F 1/00 415/1 |
| 2017/0216837 A1 * | 8/2017 | Schwemmer | B01L 3/50273 |
| 2018/0291912 A1 * | 10/2018 | Paust | F04F 1/00 |
| 2019/0070607 A1 * | 3/2019 | Czilwik | B01L 3/502723 |

FOREIGN PATENT DOCUMENTS

| | | |
|---|---|---|
| CN | 103706413 B | 12/2015 |
| DE | 102005048233 A1 | 4/2007 |
| DE | 102009050979 A1 | 5/2011 |
| DE | 202011108189 U1 | 2/2012 |
| DE | 102012202775 A1 | 8/2013 |
| DE | 102013210818 B3 | 5/2014 |
| DE | 102013215002 B3 | 6/2014 |
| DE | 102013203293 A1 | 8/2014 |
| DE | 102013218978 B3 | 11/2014 |
| DE | 102016208972 A1 * | 11/2017 |
| EP | 2455162 A1 | 5/2012 |
| WO | 03072254 A1 | 9/2003 |
| WO | 2006102421 A2 | 9/2006 |
| WO | 2013045631 A1 | 4/2013 |

OTHER PUBLICATIONS

Abi-Samra, Kameel et al., "Thermo-pneumatic pumping in centrifugal microfluidic platforms", Microfluid Nanofluid DOI 10.1007/s10404-011-0830-5, Jun. 17, 2011, DOI 10.1007/s10404-011-0830-5.

Czilwik, G. et al., "Fully Integrated PCR Detection of Pathogens for Fast Diagnosis of Neonatal Sepsis on Labdisk", HSG-IMIT, Freiburg, Germany.

Daniel, Mark et al., "Lab on a Chip: Centrifugo-pneumatic valve for metering of highly wetting liquids on centrifugal microfluidic platforms", RSC 2009, Lab Chip, 2009, 9, 3599-3603, Oct. 12, 2009, 3599-3603.

Focke, Maximilian et al., "Centrifugal microfluidic system for primary amplification and secondary real-time PCR", RSC 2010 Lab Chip, 2010, 10, 3210-3212, Sep. 14, 2010, 3210-3212.

Gorkin, Robert et al., "Centrifugo-pneumatic valving utilizing dissolvable films", RSC 2012, Lab Chip, 2012, 12, 2894-2902, Jun. 13, 2012, 2894-2901.

Gorkin, Robert et al., "Pneumatic Pumping in Centrifugal Microfluidic Platforms", Microfluidics and Nanofluidics, Springer, Berlin, DE, bd.9, Nr. 2-3, Feb. 17, 2010, pp. 541-549.

Kinahan, D. J., "Imbibition-Modulated Event-Triggering of Centrifugo-pneumatic Cascading for Multi-Stage Dilution Series", 17th International Conference on Miniaturized Systems for Chemistry and Life Sciences Oct. 27-31, 2013, Freiburg, Germany, Oct. 2013, 317-319.

Richter, M. et al., "Microchannels for applications in liquid dosing and flow-rate measurement", Sensors and Actuators A 62 (1997) 480-483 Fraunhofer Institute for Solid-State Technology. HansastraBe 27d, D-80686 Munich, Germany, 1997, 480-483.

Schembri, C. T. et al., "Centrifugation and capillarity integrated into a multiple analyte whole blood analyser", Journal of Automatic Chemistry, vol. 17, No. 3 (May-Jun. 1995), pp. 99-104, May 1995, 99-104.

Siegrist, Jonathan et al., "Validation of a centrifugal microfluidic sample lysis and homogenization platform for nucleic acid extraction with clinical samples", The Royal Society of Chemistry 2010 Lab on a Chip, 2010, 10, 363-371, Nov. 23, 2009, 363-371.

Ukita, Yoshiaki et al., "Internally Triggered Multistep Flow Sequencers Using Clepsydra", 16th International Conference on Miniaturized Systems for Chemistry and Life Sciences, Oct. 28-Nov. 1, 2012, Okinawa, Japan, Unknown, 1465-1467.

Wisam, Al-Faqheri et al., "Vacuum/Compression Valving (VCV) Using Parrafin-Wax on a Centrifugal Microfluidic CD Platform", PLOS ONE, Mar. 1, 2013, vol. 8, Issue 3, Mar. 11, 2013, 1-9.

Bruus, H., Theoretical Microfluids, 1st ed. Oxford University Press, Oxford, 2008, Chapter 4, 2008, 11 pages.

Hutzenlaub, T., et al., The effect of wetting properties on bubble dynamics and fuel distribution in the flow field of direct methanol fuel cells, Journal of Power Sources, 196(19):8048, 2011., Apr. 2011, 9 pages.

Richter et al.,, M., et al., Microchannels for applications in liquid dosing and flow-rate measurement. Sensors & Actuators A 62 (1997) 480-483, 1997, 4 pages.

Schwarz, I., et al., System-level network simulation for robust centrifugal-microfluidic lab-on-a-chip systems, Lab Chip. May 10, 2016;16(10)1, May 2016, 13 pages.

* cited by examiner

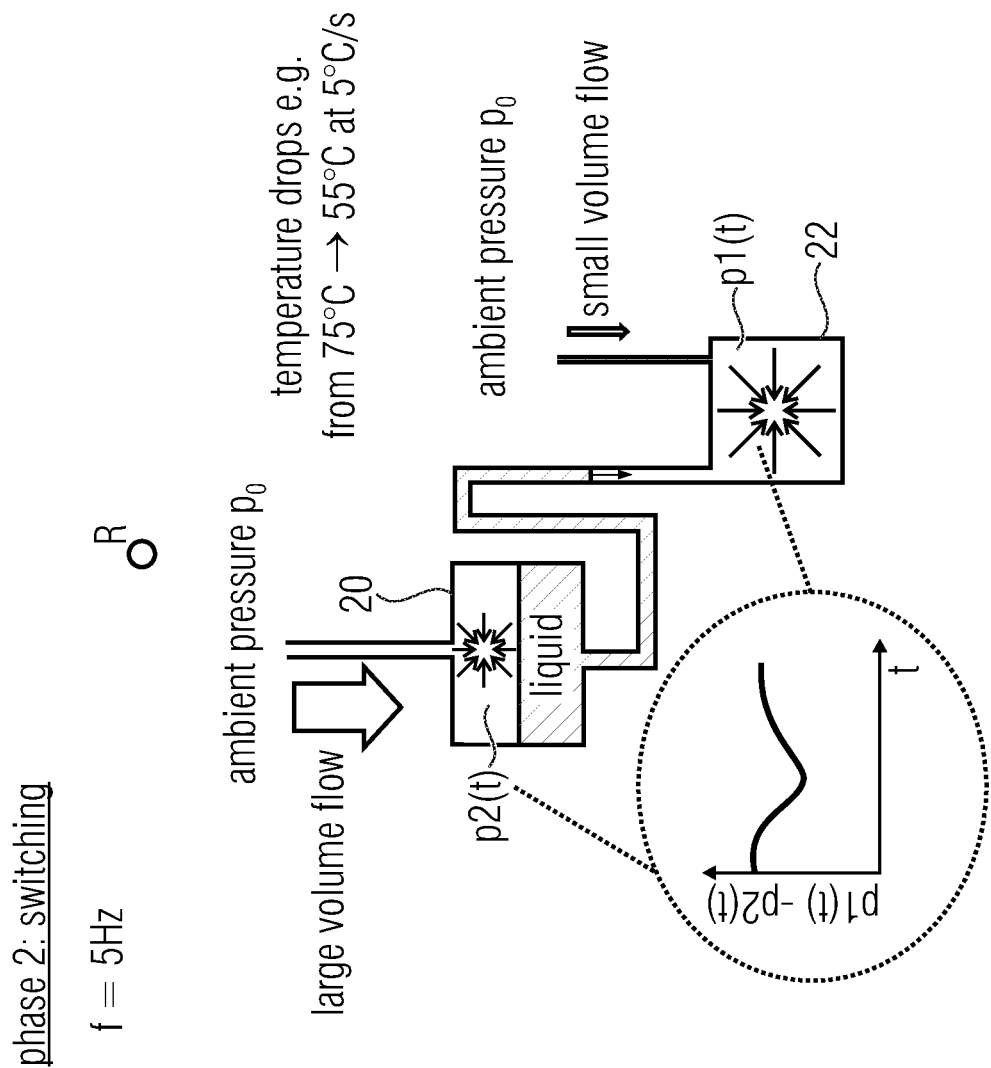

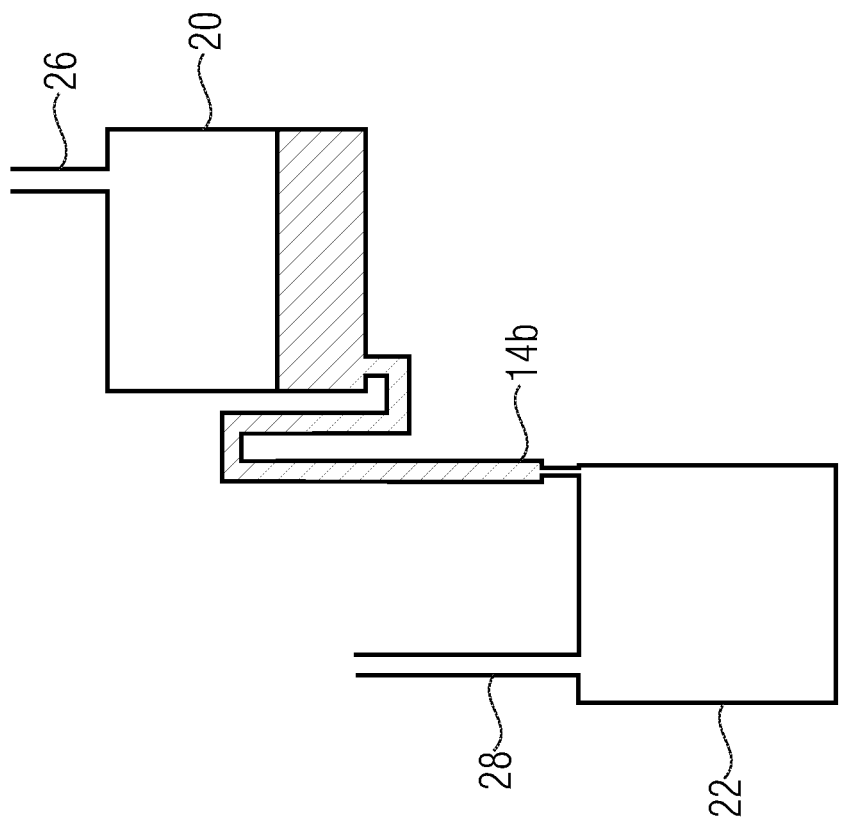
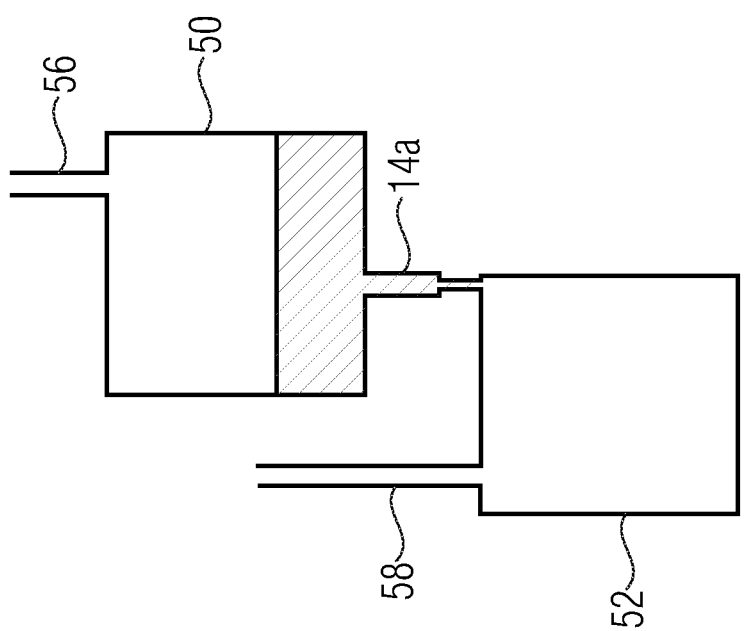

FLUID HANDLING METHOD TO SWITCH A VALVE DEVICE OR TO TEMPORARILY COUNTERACT A FLOW

CROSS-REFERENCES TO RELATED APPLICATIONS

This application is a continuation of copending International Application No. PCT/EP2017/060075, filed Apr. 27, 2017, which claims priority from German Application No. DE 102016207845.3, filed May 6, 2016, which are each incorporated herein in its entirety by this reference thereto.

The present invention relates to devices and methods for handling liquids and, in particular, to such devices and methods which enable fluid-dynamic control of a flow of liquid from an inlet chamber into an outlet chamber through a connecting duct.

BACKGROUND OF THE INVENTION

Centrifugal microfluidics deal with handling liquids within the picoliter to milliliter ranges within rotating systems. Such systems are mostly disposable polymer cartridges used within or instead of centrifuge rotors with the intention of automating laboratory processes. In this context, standard laboratory processes such as pipetting, centrifuging, mixing or aliquoting may be implementing within a microfluidic cartridge. To this end, the cartridges contain ducts for guiding fluid as well as chambers for receiving liquids. The cartridges are subjected to a predefined sequence of rotational frequencies, the frequency protocol, so that the liquids contained within the cartridges may be guided into corresponding chambers by means of the centrifugal force.

Centrifugal microfluidics are applied mainly in laboratory analytics and in mobile diagnostics. The most common implementation of cartridges so far has been a centrifugal-microfluidic disc employed in specific processing devices. Other formals such as a microfluidic centrifuge tube may be employed in rotors of already existing standard laboratory devices.

One essential basic operation that may be performed in centrifugal-microfluidic cartridges is to retain and release liquids through a valve in a targeted manner. The problem consists in transferring liquids from a first fluid chamber (inlet chamber) into a second fluid chamber (outlet chamber) at defined rotational frequencies, or to retain liquids within a first chamber at defined rotational frequencies.

It is known from conventional technology to implement such basic operations in centrifugal-microfluidic systems while using monolithically integrated valves.

[1] describes a capillary siphon valve. Capillary siphon valves consist of an S-shaped duct via which a first chamber is connected to a second chamber. The vertex of the siphon duct is located at a point that is radially lower than the liquid level within the first chamber. In the event of increased rotational speed, centrifugal forces will dominate the capillary pressures. If the rotational speed drops below a switching frequency, capillary forces will draw the liquid radially inward across the vertex and will draw the liquid, on the descending branch of the siphon duct, radially across the liquid level within the first chamber. If the rotational frequency is increased again, the siphon duct thus filled may be emptied, together with the liquid, from the first chamber into the second chamber.

[2] discloses a centrifugal-pneumatic valve. The centrifugal-pneumatic valve is based on the arising pneumatic counterpressure that is generated within a closed air volume when liquid is pressed into said air volume by means of centrifugal pressure. In this context, the liquid within a first chamber is connected to the air volume within a second, non-vented chamber via a thin duct which radially leads towards the outside. When the centrifugal pressure reaches a switching frequency, a Rayleigh-Taylor instability of the interfaces between liquid and air results, so that the liquid flows radially outward into the second chamber, whereas air is displaced radially inward from the second chamber into the first chamber.

[3] describes a centrifugal-pneumatic valve with a dissolvable membrane wherein the air volume has been closed with a dissolvable membrane as compared to the centrifugal-pneumatic valve described in [2]. Once the liquid has been transferred from the first chamber into the second chamber, the membrane will dissolve and will possibly open up an outflow duct from the second chamber.

[4] describes a hydraulic valve which uses a first non-vented chamber within which the liquid to be switched is located. By increasing the centrifugal pressure, the air volume enclosed within the first chamber is expanded until eventually the liquid is transferred into a second chamber via a radially extending duct.

A time-controlled valve wherein a paper strip which performs wetting in a capillary manner opens vents in a time sequence by wetting dissolvable membranes is described in [5]. The opened membranes vent previously closed air volumes and thus clear ducts for centrifugally driven liquids. The liquid duct itself contains a second dissolvable membrane which is wetted by the original counterpressure, now lacking, of the now-vented air volume and which will open up.

A water meter valve is known from [6]. With the water meter valve, a liquid from a first chamber will empty into a second chamber over time in that same is centrifugally pressed by a resistor. One by one, the filling level releases ventings of further chambers wherein subsequently, liquids are centrifugally advanced by dissolving the negative pressure previously existing within the closed air volumes by means of venting.

[7] describes a vacuum/compression valve wherein vents of a first or second chamber are opened by melting paraffin wax so as to subsequently centrifugally switch liquid from the first chamber into the second chamber.

From [8], a thermo-pneumatic valve is known wherein a closed air volume within a first chamber, which is connected to a liquid within a second chamber via a duct, is heated up. Due to the ideal gas expansion, the liquid from the second chamber is displaced into a second duct and into a third chamber.

From [9], thermal transfer methods are known wherein the temperature prevailing within one or more chambers is changed so as to produce a vacuum in order to draw liquids in selected directions within a process array.

From [10] and [11], fluidic structures are further known which enable splitting a liquid volume into many partial volumes; in accordance with [11], several siphon structures arranged between fluid chambers are used so as to control a flow of liquid between the chambers.

SUMMARY

According to an embodiment, a fluid handling device may have: fluidic structures having at least one inlet chamber, one outlet chamber, and a connecting duct which fluidically connects the inlet chamber to the outlet chamber, wherein in a first state, the inlet chamber is completely filled with at least a liquid or partly filled with at least a liquid and partly filled with a compressible medium, and the outlet chamber is at least partly filled with the compressible medium, wherein one of the inlet chamber and the outlet chamber has such a venting duct that a flow resistance/volume product of venting of said chamber for the compressible medium amounts to at least $$6700 \frac{N \cdot s}{m^2},$$

the other of the inlet chamber and of the outlet chamber being vented, an actuation means for actuating the fluidic structures on the basis of the first state so as to cause, due to different pressure equalization rates of the inlet chamber and of the outlet chamber, which are due to different flow resistance/volume products, a pressure difference of at least 30 Pa between the compressible medium within the inlet chamber and the compressible medium within the outlet chamber, so as to thereby switch a valve device implemented into the connecting duct, such that liquid gets from the inlet chamber into the outlet chamber, or so as to thus temporarily counteract a flow, caused by the actuation, from the inlet chamber into the outlet chamber, wherein the respective flow resistance/volume product is defined by the product resulting from the volume of the respective chamber and a fluidic resistance $R_{fl}$ of the respective venting duct, having $$R_{fl} = C_{geometry} \cdot \frac{\eta l}{A^2}$$

wherein $C_{geometry}$ is a geometry-dependent factor, $\eta$ is the viscosity of the compressible medium, l is the length of the respective venting duct, and A is the cross sectional area of the respective venting duct.

According to another embodiment, a fluid handling method may have the steps of: providing an inventive fluid handling device; and actuating the fluidic structures so as to cause, due to different pressure equalization rates of the inlet chamber and of the outlet chamber, the pressure difference of at least 30 Pa between the compressible medium within the inlet chamber and the compressible medium within the outlet chamber so as to thereby switch the valve device implemented into the connecting duct, such that liquid gets from the inlet chamber into the outlet chamber, or so as to thus temporarily counteract the flow, caused by the actuation, from the inlet chamber into the outlet chamber.

Embodiments are based on the finding that it is possible to handle liquid by providing two differently vented fluid chambers connected to each other via a connecting duct. One has found that it is possible, by actuating such fluidic structures, to cause a pressure difference of at least 30 Pa or more between the compressible medium within the inlet chamber and the outlet chamber if one of the two chambers has a flow resistance/volume product of the venting of at least $$6700 \frac{N \cdot s}{m^2},$$

(Newton times second divided by square meter) (also referred to as a large flow resistance/volume product below).

In embodiments, this enables switching of a valve device implemented within the connecting duct. In embodiments, this enables temporarily counteracting a flow, which is caused by the actuation, from the inlet chamber into the outlet chamber through the connecting duct.

BRIEF DESCRIPTION OF THE DRAWINGS

Embodiments of the present invention will be detailed subsequently referring to the appended drawings, in which:

FIG. 3a to 3d show schematic representations for illustrating the mode of operation of the embodiment shown in FIG. 2;

FIGS. 5a and 5b show schematic representations of alternative embodiments; and

DETAILED DESCRIPTION OF THE INVENTION

Before embodiments of the invention will be addressed by means of the figures, some general underlying aspects will first be explained.

Figure 1A:
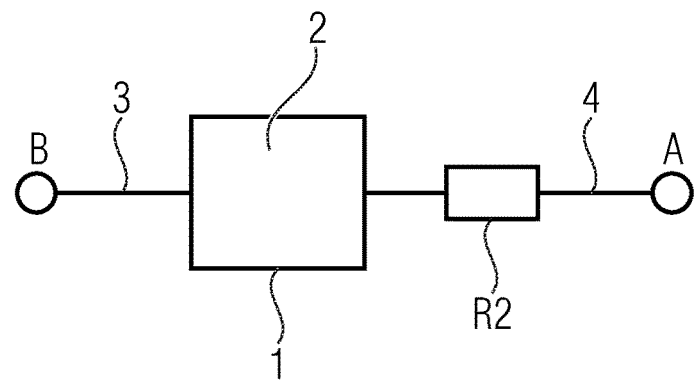
FIGS. 1a and 1b show schematic representations for illustrating the principle underlying the invention.

FIG. 1a shows the basic design of a fluid chamber 1 having a volume V1, which is fully or partly filled with a compressible fluid 2. The pressure inside the chamber 1 is determined via a function p(T) of the temperature, e.g., by heating/cooling, or via function p(V) via the volume, e.g., by compression/expansion. The fluid chamber 1 is connected to a point B via a resistance-free fluidic duct 3. Thus, the pressure in point B equals the pressure within the fluid chamber 1. The fluid chamber 1 is connected to a fluidic duct 4 which has a fluidic resistance R2 and at whose end (point A) a pressure P1 prevails. In this configuration, given an existing pressure gradient from the chamber 1 to point A, the pressure difference will equalize via the fluid duct 4 having the flow resistance R2 via/across the fluid duct 4. Said basic design underlies embodiments of the invention and may be considered to be a core element. Point B may be integrated into any fluidic network so as to control processes, e.g. switching of a fluid valve or pumping of a fluid, by means of the pressure and/or the temporal pressure curve in point B.

In embodiments, the chamber 1 may be the inlet chamber or the outlet chamber. In embodiments of the invention, point B may be formed by the mouth of the connecting duct which leads into the corresponding chamber. The fluid duct 4 having the fluid resistance R2 may, in embodiments, represent the venting duct of the fluid chamber which exhibits the large flow resistance/volume product.

Embodiments of the invention are based on the finding that by means of the design of the course and of the dimensions of the fluidic resistance R2 as well as by means of the dimensions of the fluid chamber 1 it is possible to exploit the dynamics of temporary pressure equalization processes so as to generate pressure conditions within point B which may be used in a fluidic network, for example as a switching signal for a pressure valve.

In embodiments, a temporary change in pressure is caused by a change in the temperature within a vented chamber having a defined flow resistance R of the venting. In order to maintain the pressure difference caused by the temperature change for a certain amount of time (t1), either the resistance R may be large or a large volume of the chamber may be available. A decisive quantity for the implementation thus is the product of the flow resistance and the chamber volume available, i.e., the flow resistance/volume product. The specific time t1 is important for two reasons. Firstly, since the change in temperature within the volume involves a certain amount of time, and secondly, since the switch involves a certain amount of time to be actuated.

In embodiments, point B may be implemented by a connecting duct and a further vented fluid chamber. The further fluid chamber may be vented by means of a venting opening having a flow resistance that is virtually zero, or by means of a venting duct, the flow resistance/volume product of the further fluid chamber being smaller than a quarter of the flow resistance/volume product of the fluid chamber 1. One has found that such a ratio may be advantageous so as to effect a sufficiently high pressure difference of 30 Pa or more by means of corresponding actuation.

Venting herein means fluidic connection to the surroundings. "Surroundings" to which the venting ducts are coupled may herein be understood to mean a volume that is larger than the overall volume within the system by a factor of at least 2. The surroundings may either be the atmosphere or be connected to same via a small fluidic resistance, so that a thermal change results in basically no pressure difference in the surroundings that would be relevant to switching.

Figure 1B:
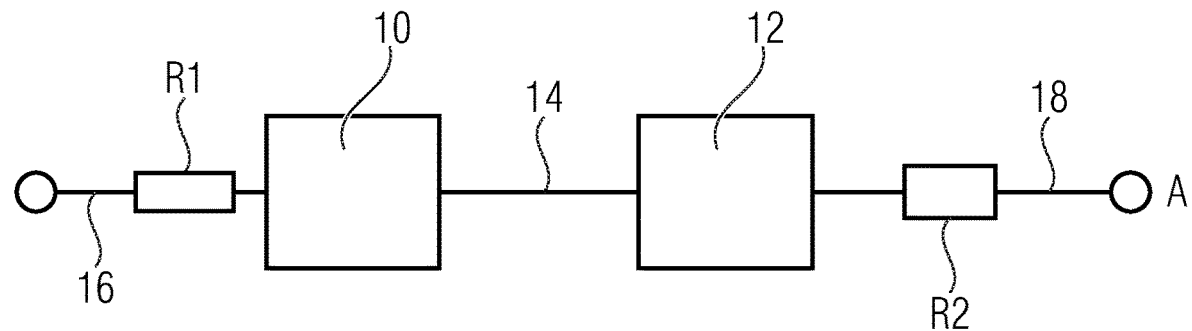

FIG. 1b shows the application of the above principle to fluidic structures which may be formed within a fluidic module, as will be explained later on with reference to FIGS. 5a, 5b and 6. The fluidic structures shown in FIG. 1b comprise a first fluid chamber 10, a second fluid chamber 12 and a connecting duct 14. The second chamber is connected to the point A via a venting duct 18 comprising a flow resistance R2. The point A may be at ambient pressure. The second chamber 12 comprises the large flow resistance/volume product. The first chamber 10 is also vented, e.g. via a venting duct 16 having a flow resistance R1. Alternatively, the first chamber might also be vented by a venting opening so that the flow resistance for the venting is virtually zero.

The flow resistance/volume product of the second fluid chamber amounts to at least $$6700 \frac{N \cdot s}{m^2}.$$

In addition, in embodiments, said flow resistance/volume product is at least four times larger than that of the other fluid chamber. V2·R2≥V1·R1 applies, wherein V2 is the volume of the second fluid chamber 12, R2 is the venting flow resistance of the second fluid chamber 12, V1 is the volume of the first fluid chamber 10, and R1 is the venting flow resistance of the first fluid chamber 10. Said ratio between the flow resistance/volume products is to be regarded as met if the flow resistance of the venting of the other fluid chamber is virtually zero, for example because the other fluid chamber is not vented via a duct but via an opening having a large cross section. In this manner, different pressure equalization rates may be effected within the fluid chambers 10 and 12 during operation, by means of which switching at a constant rotational frequency or time-delayed pumping of liquid may take place.

Unless indicated otherwise, flow resistance here is to be understood to mean the resistance to a flow of the compressible medium, typically air. The fluidic resistance $R_{fl}$ of a fluid duct may be calculated as being $$R_{fl} = C_{geometry} \cdot \frac{\eta l}{A^2}$$

wherein η is the viscosity of the compressible medium (air), l is the length of the fluid duct, and A is the cross-sectional area of the fluid duct. $C_{geometry}$ is a geometry-dependent factor, persons skilled in the art being familiar with corresponding geometry factors for different duct cross sections. For example, for a rectangular duct cross section, $C_{geometry}$ is defined by:

$$C_{geometry} = \frac{2}{As \sum_{i=1}^{\infty} \frac{As}{\alpha_i^5} \left( \frac{\alpha_i}{As} - \tanh\left(\frac{\alpha_i}{As}\right) \right)}.$$

Here, As is defined by As=h/w (h=height of the fluid duct, w=width of the fluid duct) and $\alpha_i$ is defined by $$\alpha_i = \frac{\pi(2i-1)}{2}.$$

For calculating the flow resistance, in particular while using the above equations, please refer to [12], for example.

A flow resistance/volume product here is understood to mean the product of the volume of a chamber and the flow resistance of the venting duct, associated with the chamber, for the compressible medium.

During operation, a liquid is introduced into the inlet chamber, so that the inlet chamber is completely filled with the liquid or is partly with the liquid or is partly filled with the compressible medium, the outlet chamber being at least partially filled with the compressible medium. This represents the first non-actuated state. The compressible medium will typically be air; however, other gasses may also be used. The liquid may be aqueous solutions, whole blood or blood serum or liquids with comparable levels of viscosity, for example.

On the basis of said first state, the fluidic structures are actuated, so that a pressure difference of at least 30 Pa is generated between the pressures in the compressible medium within both fluid chambers.

In embodiments, the connecting duct 14 comprises a valve device, e.g., a siphon or a capillary valve. In such embodiments, for example, in the first state a rotational body comprising the fluidic structures may be rotated at a rotational speed at which the valve device prevents liquid from passing from the inlet chamber into the outlet chamber through the connecting duct. On the basis of the first state, actuation may then take place by means of heating or cooling. In embodiments, the second chamber 12 represents the inlet chamber, and the chamber 10 represents the outlet chamber. In such embodiments, heating may result in the generation of such an excess pressure in the compressible medium within the inlet chamber as compared to the compressible medium within the outlet chamber that as a result, the valve device will be switched and liquid will be driven from the inlet chamber into the outlet chamber. In embodiments, the second chamber 12 represents the outlet chamber, and the first chamber 10 represents the inlet chamber. In such embodiments, such a negative pressure may be generated, by cooling, in the compressible medium within the outlet chamber as compared to the compressible medium within the inlet chamber that as a result, the valve device will be switched and liquid will be drawn from the inlet chamber into the outlet chamber.

In embodiments, corresponding heating may be effected at a heating rate of ≥0.1 K/s or of ≥0.5 K/s. In embodiments, corresponding heating may be effected at an averaged heating rate of ≥0.1 K/s or of ≥0.5 K/s. The averaged heating rate may be defined by the mean value of heating rates during heating of the compressible medium from a temperature T1 to a temperature T2, wherein T1<T2. In embodiments, corresponding cooling may be effected at a cooling rate of ≥0.1 K/s or of ≥0.5 K/s. In embodiments, corresponding cooling may be effected at an averaged cooling rate of ≥0.1 K/s or of ≥0.5 K/s. The averaged cooling rate may be defined by the mean value of cooling rates during cooling of the compressible medium from a temperature T2 to a temperature T1, wherein T1<T2. It was found that corresponding heating rates and cooling rates enable suitable actuation so as to be able to cause a sufficient pressure difference. In embodiments, the fluidic structures (flow resistances and volumes) may be designed such that a corresponding pressure difference may be achieved at an averaged heating rate and/or cooling rate ranging from 0.5 K/s to 5 K/s or from 0.5 K/s to 10 K/s.

In embodiments, heating or cooling of the compressible medium may be performed globally by heating or cooling the surrounding air. Expensive heating/cooling structures designed to effect localized heating/cooling will then be unnecessary.

In embodiments, heating or cooling may be locally effected within the inlet chamber and/or outlet chamber, which enables energy-saving operation.

In embodiments, the actuation means is designed to effect the pressure difference by mechanical compression or decompression of the compressible medium. For example, the actuation means may be designed to subject the liquid within the inlet chamber to a force by means of which the liquid is driven from the inlet chamber into the outlet chamber through the connecting duct. Due to the different pressure equalization rates of the inlet chamber and of the outlet chamber, consequently either the compressible medium within the inlet chamber may be decompressed, if the chamber 12 is the inlet chamber, or the compressible medium within the outlet chamber may be compressed, if the chamber 12 is the outlet chamber. As a result, a flow from the inlet chamber into the outlet chamber, which is caused by the actuation, may be temporarily counteracted. Temporarily is understood to mean that said counteracting takes place for such time until the pressure difference between the inlet chamber and the outlet chamber, which is generated due to the different pressure equalization rates, is equalized. In other words, in such embodiments the actuation means may be configured to subject the liquid within the inlet chamber to such a force that the liquid within the inlet chamber has excess pressure acting on it as compared to the pressure prevailing within the outlet chamber, said excess pressure being temporarily reduced by the pressure difference caused in the compressible medium within the inlet chamber and the outlet chamber. As a result, the flow from the inlet chamber into the outlet chamber is decreased.

In embodiments, the liquid may be subjected to a force by increasing a rotational frequency at which the fluidic structures are rotated. For example, in the first state, the rotational frequency may be zero or low enough so that due to surface tensions, no flow of liquid into the outlet chamber takes place at the point where the connecting duct leads into the outlet chamber. Starting from such a first state, the rotational frequency may be increased, e.g., at an increase rate of ≥1 Hz/s, so as to actuate the fluidic structures.

In embodiments of the invention, the fluidic structures are formed within a fluidic module which represents body of rotation or may be inserted into a body of rotation. Embodiments of the invention comprise a drive means configured to subject the fluidic module and, therefore, the fluidic structures, to rotation.

Embodiments of the invention thus provide devices, fluidic modules and methods for controlled discharge and for controlled guidance of a liquid through a duct, and in particular, such devices, fluidic modules and methods which are suitable for time-switched pumping of a liquid within centrifuge rotors. Embodiments enable such basic operations within a robust process, for example by means of a monolithically integrated valve (a valve integrated into the connecting duct), so that no additional components or materials are required which would substantially increase the cost of a cartridge, e.g., in terms of material cost or additional structural design and connection technology (assembly).

Embodiments are based on the finding that it is possible to pump liquid over a specific radial distance at a constant rotational frequency by using vented fluid chambers connected via a connecting duct, the fluid chambers and their venting being configured such that different pressure equalization rates prevail within the fluid chambers. Such different pressure equalization rates may be implemented by means of different flow resistance/volume products. Embodiments of the invention thus provide devices, fluidic modules and methods for pumping a liquid which enable time-controlled switching and/or pumping at a constant rotational frequency over a specific radial distance. Other embodiments enable delayed time-dependent pumping of liquids.

Figure 2:
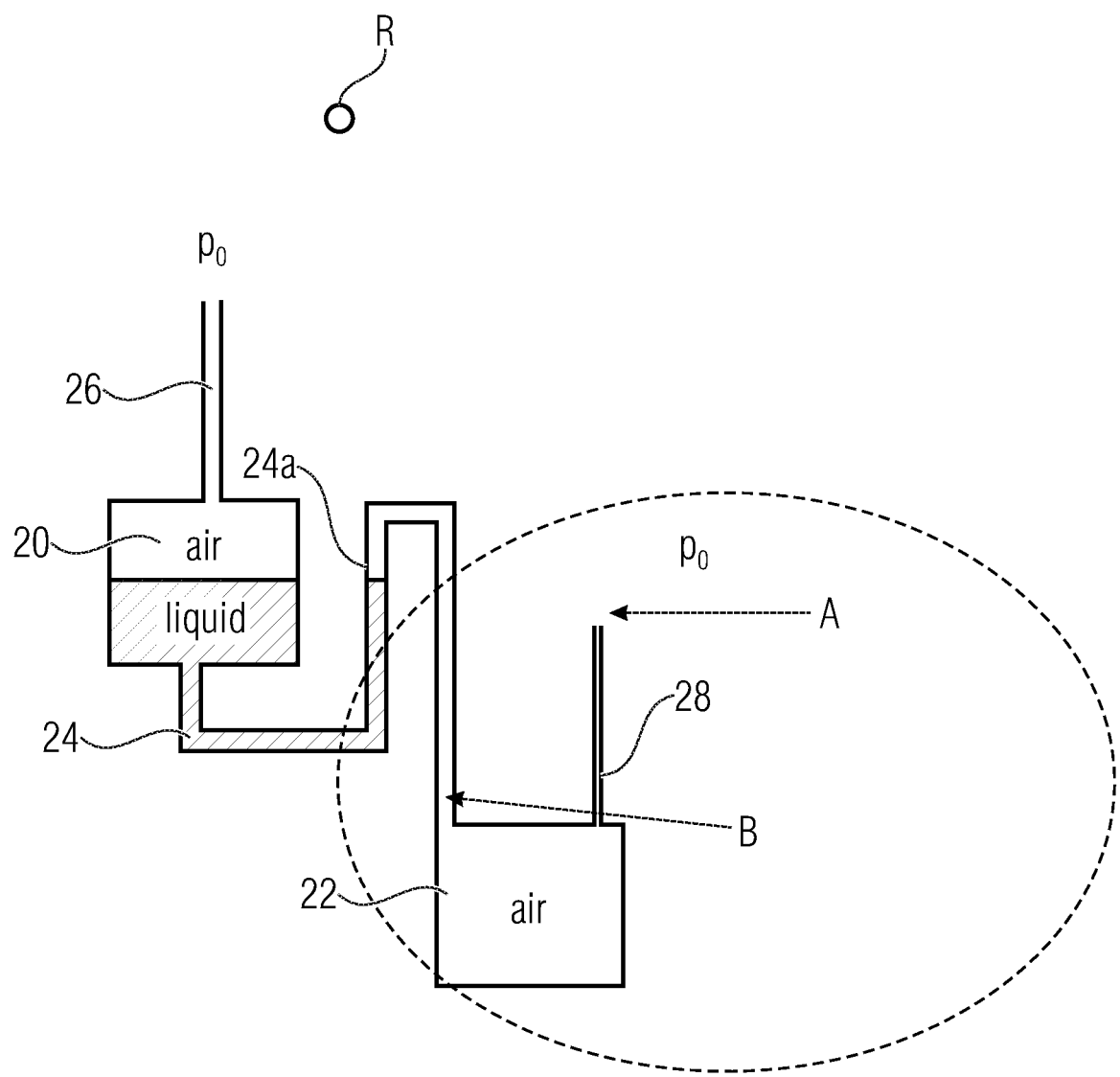
FIG. 2 shows a schematic representation of fluidic structures in accordance with an embodiment for switching of liquid.

FIG. 2 shows an embodiment of fluidic structures within a centrifugal-microfluidic system which represent a fluid switch. The fluidic structures are actuated such that within an outlet chamber, a negative pressure is generated as compared to an inlet chamber, by means of which negative pressure the liquid is drawn out of the inlet chamber and into the outlet chamber. The fluidic structures comprise a vented inlet chamber 20, a vented outlet chamber 22, a connecting duct 24 which fluidically connects the inlet chamber 20 and the outlet chamber 22 and comprises a siphon, an inlet chamber venting duct 26 and an outlet chamber venting duct 28. The venting ducts lead into the chambers 20 and 22, respectively, in radially inner areas. The connecting duct 24 leads into a radially outer area of the inlet chamber 20 and into a radially inner area of the outlet chamber 22.

Positions which correspond to points A and B in FIG. 1a are depicted by dashed arrows in FIG. 2. The venting ducts are coupled to an ambient pressure $p_0$ in each case, so that the ambient pressure $p_0$ prevails at point A. The venting duct 26 comprises a fluidic resistance R1, the venting duct 28 comprises a fluidic resistance R2, and the venting duct 24 comprises a fluidic resistance R3. R3<<R2 applies, so that R3 is negligible as compared to R2. Further, R1<<R2 applies, so that a flow resistance/volume product of the outlet chamber 22 is larger than or equal to four times the flow resistance/volume product of the inlet chamber 20. The fluid structures are rotatable about a center of rotation R.

As shown in FIG. 2, the inlet chamber 20 is filled with a liquid and air as an example of a compressible fluid. The inlet chamber 20 is connected to the outlet chamber 22 via the connecting duct 24, which comprises a radially inwardly extending duct portion 24a extending radially further inward than the filling level of the liquid within the inlet chamber 20. The connecting duct 24 thus forms a difference in potential under rotation (siphon).

The progress of a switching operation is schematically depicted in FIGS. 3a to 3d. During a first phase 1 depicted in FIG. 3a, the centrifugal system is under rotation at a constant rotational frequency (of, e.g., 5 Hz) at a first temperature (of, e.g., 75° C.). The difference in potential cannot be overcome by the liquid, and the liquid will initially remain within the inlet chamber 20. This represents the first non-actuated state of the fluidic structures.

On the basis of said state, the temperature is reduced to, e.g., 55° C. at a given point in time during a first phase 2 shown in FIG. 3b. In this context, a fast drop in temperature is assumed, e.g., a drop in temperature of ≥0.1 K/s or ≥0.5 K/s. As a result, the air within the rotating system and, therefore, within both chambers 20 and 22 will compress in accordance with the ideal gas equation. Due to the thermal compression of the air within the chambers 20 and 22, a pressure gradient will arise between the surroundings (pressure $p_0$) and the chambers 20 and 22, whose time curve depends on the fluidic resistances of the ducts 24, 26 and 28 and on the volumes of the chambers 20 and 22; the fluid ducts and the chambers are configured, with regard to their volumes and/or flow resistances, such that the functionality described is achieved.

Air for pressure equalization cannot be provided immediately though the venting ducts since both have a fluidic resistance (i.e., since viscous dissipation takes place). Thus, a pressure profile p1(t) results within the outlet chamber 22, and a pressure profile p2(t) results within the inlet chamber 20, which due to the different flow resistances of the venting ducts also result in a pressure difference from the inlet chamber 20 to the outlet chamber 22: |p1(t)−p2(t)|>0. Because of the conditions R2>>R1 and R2>>R3, the pressure equalization within the inlet chamber 20 will take place comparatively fast, but the pressure equalization within the outlet chamber 22 will take longer in relation thereto, so that a temporal pressure difference results between the inlet chamber 20 and the outlet chamber 22 since pressure equalization cannot take place instantaneously due to the flow resistances. >> here may be understood to mean a factor of at least 4, for example.

Figure 3A:
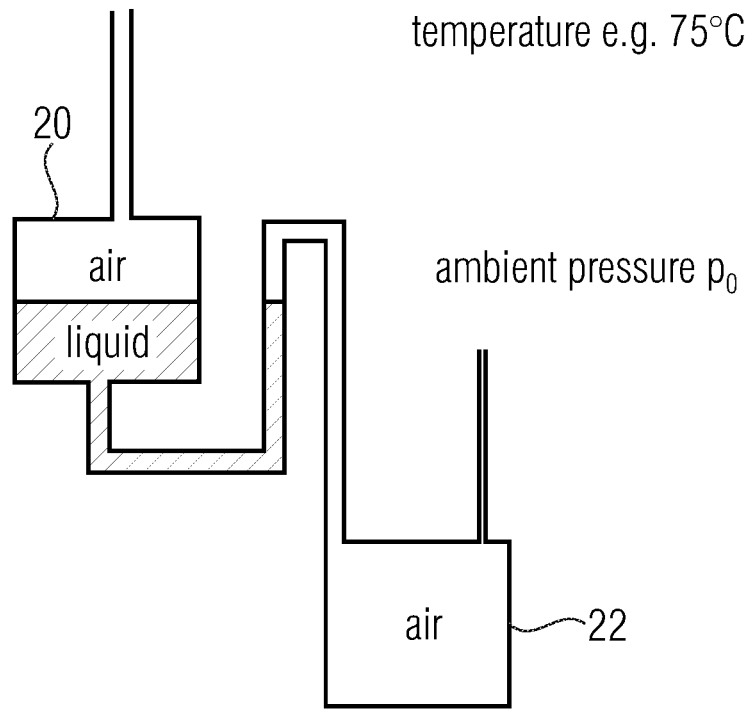
Figure 3C:
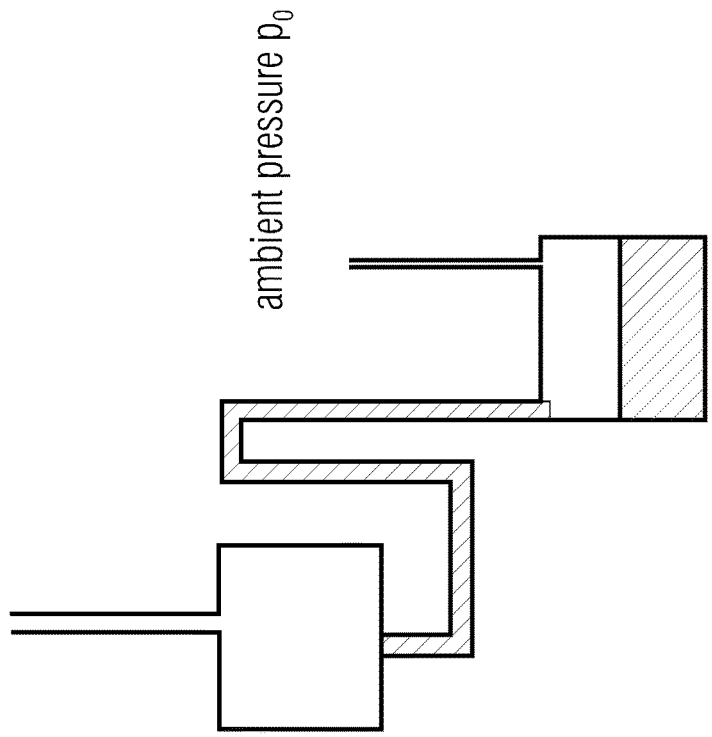

The temporal pressure gradient resulting therefrom is exploited in order to overcome the difference in potential of the liquid between the chambers 20 and 22, i.e., to activate the switch. In the example, the pressure difference between the chambers p1(t)−p2(t) will result, due to the different dynamics of pressure equalization, in that the liquid meniscus is drawn into the connecting duct 24 against the existing centrifugal force and is drawn across the vertex of the siphon. This will then lead to complete emptying of the inlet chamber 20 into the outlet chamber 22 under rotation since the connecting duct 24 overall exhibits a radial gradient. Said phase 3 is depicted in FIG. 3c. In other words, due to the short-term pressure difference, the liquid is drawn into the connecting duct 24 against the centrifugal force, and when the vertex is passed by the meniscus (filling level in the inlet chamber 20), the inlet chamber 20 will be emptied due to an interaction of p1(t)−p2(t) and the centrifugal pressure, which will be on the increase, proportionally, at this point in time.

With the assumption that R2>>R3, the resistance R3 may be neglected in a first approximation. A further assumption in this context is that the viscous dissipation of the liquid within the connecting duct 24 is smaller than the viscous dissipation of the air within the venting duct 28.

Figure 3D:
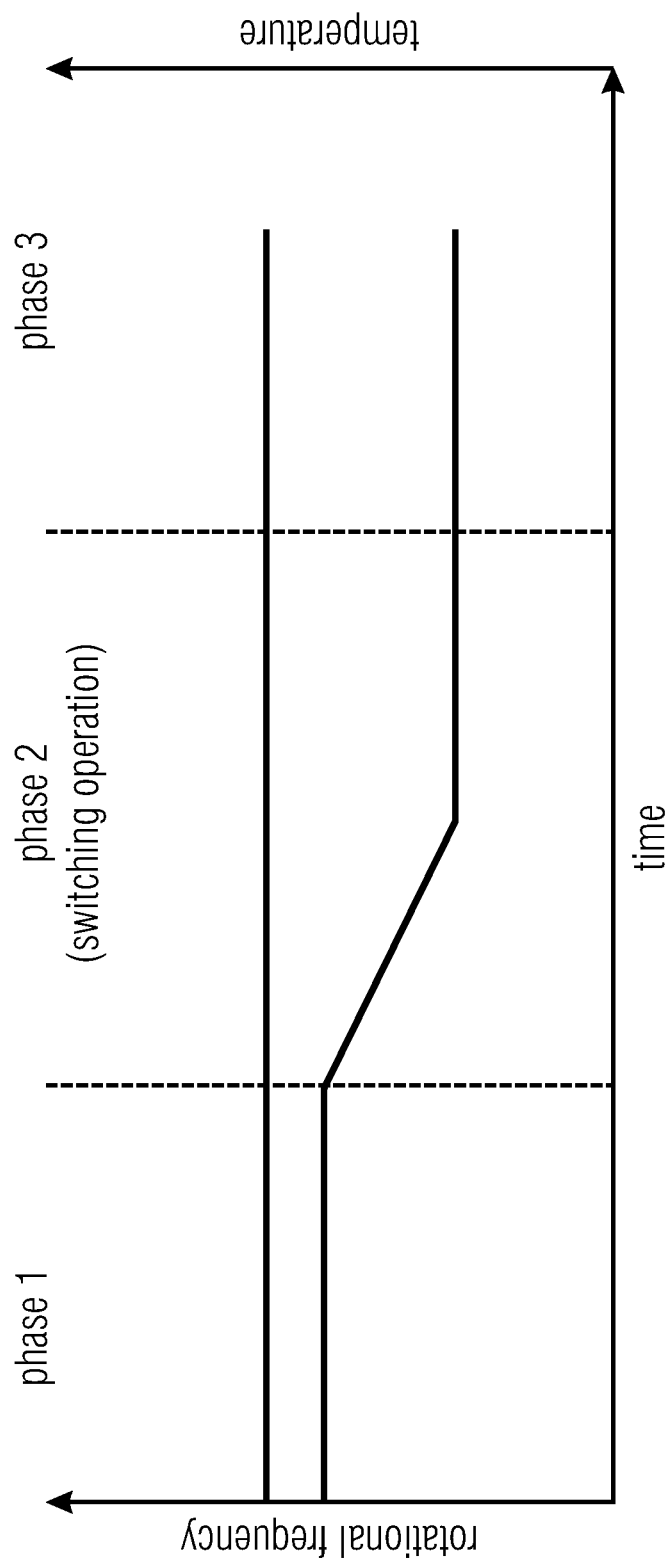

FIG. 3d shows the rotational frequency and the temperature during the three phases. The rotational frequency is constant during the three phases. As a drive means, a centrifuge may be used whose rotational frequency need not be adjustable to different frequencies and whose rotational direction need not be reversible. The temperature is reduced during the second phase. Corresponding temperature control may be effected by means of a heating/cooling device configured to heat or cool the entire body of rotation, or the entire fluidic module within which the fluidic structures are formed. To this end, a corresponding heating and/or cooling plate or radiation heating and/or cooling may be provided.

In the embodiment described with reference to FIG. 2, the outlet chamber 22 has the large flow resistance/volume product (of at least $$6700 \frac{N \cdot s}{m^2}).$$

In an alternative embodiment, the fluidic structures differ from the structures shown in FIG. 2 in that the inlet chamber 20 comprises the large flow resistance/volume product, for example in that the flow resistances of the venting ducts 26 and 28 are swapped. The flow resistance/volume product of the inlet chamber 20 would then be higher (>4 times) than the flow resistance/volume product of the outlet chamber 22. In such an embodiment, excess pressure may be generated within the fluidic structures, on the basis of phase 1, by means of raising the temperature, which excess pressure will be equalized more slowly within the inlet chamber 20 than within the outlet chamber 22. Thus, a pressure difference is effected, in turn, between the inlet chamber 20 and the outlet chamber 22, by means of which the siphon within the connecting duct may be overcome, so that the liquid is driven from the inlet chamber 20 into the outlet chamber 22.

An alternative embodiment will be described below with reference to FIGS. 4a and 4b.

Figure 4A:
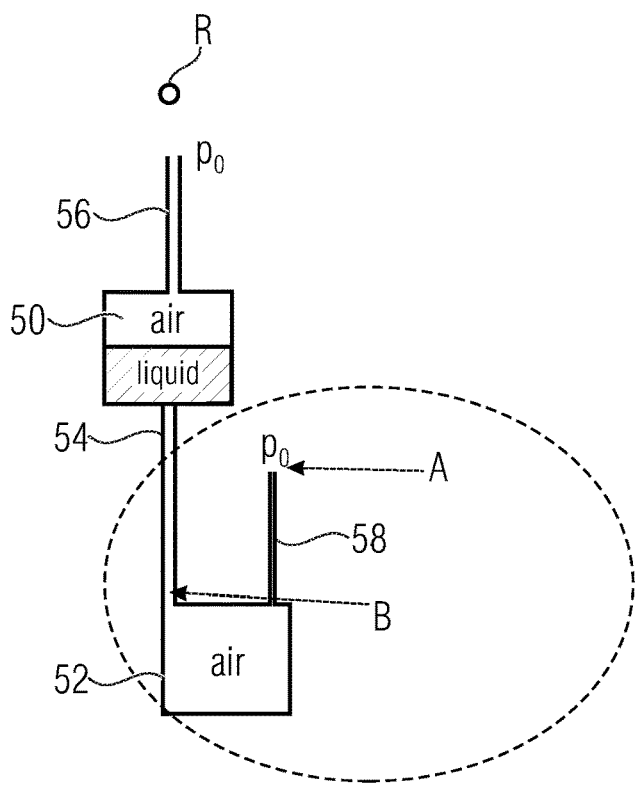
FIGS. 4a and 4b show schematic representations for illustrating an embodiment of time-delayed pumping of a liquid.

FIG. 4a schematically shows fluidic structures within a centrifugal-microfluidic system, comprising an vented inlet chamber 50, a vented outlet chamber 52 and a connecting duct 54 which fluidically connects the inlet chamber 50 to the outlet chamber 52. The inlet chamber 50 is located radially further inward in relation to the center of rotation R than does the outlet chamber 52, i.e., the connecting duct 54 exhibits a radial gradient, so that liquid may be centrifugally driven from the first chamber 50 into the second chamber 52 through the connecting duct 54. The connecting duct 54, however, comprises no potential barrier in the form of a siphon.

An inlet chamber venting duct 56 having the fluidic resistance R1 is coupled to the surroundings and leads into a radially inner area of the inlet chamber 50, and an outlet chamber venting duct 58 having the fluidic resistance R2 is connected to the surroundings and leads into a radially inner area of the outlet chamber 52. The connecting duct 54 comprising a fluidic resistance R3 leads into a radially outer area of the inlet chamber 50 and into a radially inner area of the outlet chamber 52. The flow resistance/volume product of the outlet chamber 52 amounts to at least $$6700 \frac{N \cdot s}{m^2}.$$

With regard to the fluidic resistances, the following applies: R1<<R2 and R3<<R2, so that a flow resistance/volume product of the outlet chamber 52 is larger than or four times the flow resistance/volume product of the inlet chamber 50. The fluidic structures are rotatable about a center of rotation R. Positions corresponding to the points A and B in FIG. 1a are depicted by dashed arrows in FIG. 4a.

As shown in FIG. 4a, during operation, in a first non-actuated state, the outlet chamber 52 is filled with air as an example of a compressible medium. The inlet chamber 50 is partly filled with a liquid and partly filled with an air volume. Alternatively, the inlet chamber 50 might also be completely filled with the liquid. During a first phase 1, the pressure of the liquid within the inlet chamber 50 and the air pressure within the inlet chamber 50 and the outlet chamber 52 be equal to the ambient pressure. For example, the fluidic structures may be stationary, i.e., not subject to rotation, during the first phase. During the first phase, a surface tension of the liquid may prevent said liquid from getting into the connecting duct 54 or from getting from the connecting duct 54 into the outlet chamber 52.

Figure 4B:
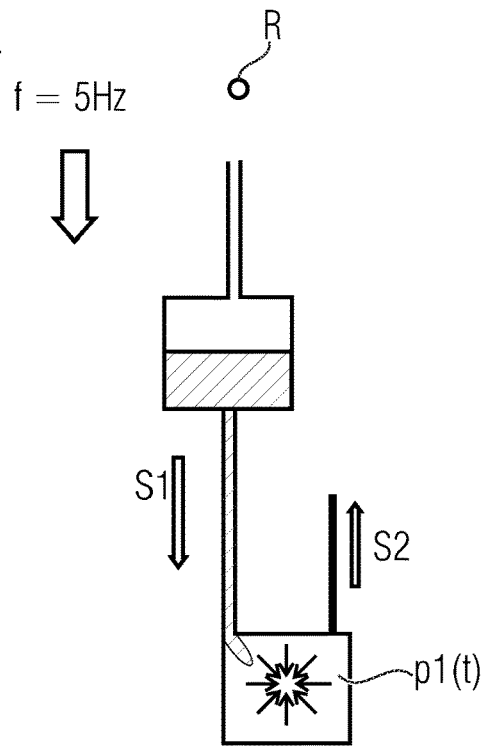

During a second phase 2, which is shown in FIG. 4b, the system is accelerated to a rotation of, e.g., 5 Hz within a short time. In this context, the centrifugal force acts upon the liquid, and a pumping mechanism is initiated by the arising centrifugal pressure. Here, the liquid flows, at a specific volume flow S1, through the connecting duct 54 and into the outlet chamber 52 and thus compresses the air volume present within the outlet chamber by ΔV. This results in a pressure increase from p(V) to p(V−ΔV) within the outlet chamber 52. The arising pressure gradient as compared to the surroundings results in that air flows into the surroundings at a specific volume flow S2 via the outlet chamber venting duct. Within the outlet chamber 52, a pressure p1(t) arises which, when assuming R2>>R3 and R2>>R1, is dependent, in a first approximation, in particular on R2 as well as on the liquid properties (e.g., viscosity) and the air properties. Consequently, the resulting volume flows S1 and S2 are dependent on p1(t) and, thus, on R2. In other words, the passage may be regulated in a step of pumping liquid from the inlet chamber 50 into the outlet chamber 52 by setting the resistance R2 so as to implement, e.g., a delay in pumping. Thus it is possible to regulate the flow rate and, therefore, the delay in emptying the inlet chamber into the outlet chamber via selecting the fluidic resistances, in particular those of the venting ducts.

In order to implement a delay when pumping a liquid from the inlet chamber into the outlet chamber, in the embodiment shown in FIG. 4, in other words, the overall air resistance may be equal to or larger than a factor multiplied by the overall liquid resistance, which factor may be 4. The overall air resistance is the resistance the air is up against with regard to exiting the outlet chamber, and the overall liquid resistance is the resistance encountered by the liquid with regard to flowing into the outlet chamber.

In an embodiment that is an alternative to the embodiment shown in FIG. 4, the inlet chamber 50 may have the large flow resistance/volume product, e.g., in that the flow resistances of the venting ducts 56 and 58 are swapped. In such an embodiment, during acceleration of the fluidic structures to the higher rotational frequency, a negative pressure is generated within the inlet chamber 50 which counteracts the centrifugal force acting upon the liquid and which thus reduces a flow of the liquid from the inlet chamber 50 into the outlet chamber 52 through the connecting duct 54.

The flow resistance of the connecting duct with regard to the liquid may be much lower than the flow resistance of the venting duct of the fluid chamber having the large flow resistance/volume product with regard to the compressible medium. The flow resistance of the connecting duct may be considered to be negligible in these cases.

In other embodiments, the flow resistance of the connecting duct with regard to the liquid may also be larger than the flow resistance of the venting duct of the fluid chamber having the large flow resistance/volume product with regard to the compressible medium. FIG. 5a shows an embodiment wherein the flow resistance of the connecting duct 14a with regard to the liquid is adapted so as to enable (multiple) transfer of a partial liquid volume. Here, a flow takes place from the inlet chamber 50 into the outlet chamber 52 until a negative pressure prevailing within the outlet chamber 52 and/or excess pressure prevailing within the inlet chamber 50 has been equalized. Subsequently, the flow comes to an end, and it is possible for residual liquid to remain within the inlet chamber 50. This process may possibly be repeated. The liquid volume to be transferred in the process may be set via the negative pressure and/or excess pressure. Thus, multiple transfers of defined sub-volumes are possible.

FIG. 5b shows an embodiment wherein the flow resistance of the connecting duct 14b with regard to the liquid is adapted to implement delayed transfer of a liquid from the inlet chamber 20 into the outlet chamber 22. The connecting duct 14b here includes a siphon valve having a downstream flow resistance. Initially, rotational frequencies may be employed within a wide spectrum without liquid being transferred from the inlet chamber 20 into the outlet chamber 22. Said transfer is prevented by the siphon valve. By means of subsequent negative pressure within the outlet chamber 22 and/or excess pressure within the inlet chamber 20, the siphon valve duct may be wetted. However, at this point in time, no transfer of liquid takes place from the inlet chamber 20 into the outlet chamber 22. Subsequently, emptying of the liquid from the inlet chamber into the outlet chamber may be controlled by increasing the rotational frequency. Thus, in combination with a second inlet chamber, which is connected to the outlet chamber via a siphon valve without any flow resistance, sequential switching of liquids into the outlet chamber may be implemented by directly transferring the liquid from the second inlet chamber at a negative pressure prevailing within the outlet chamber 22 and/or an excess pressure prevailing within the inlet chambers, and by transferring the liquid from the first inlet chamber 20 not until the rotational frequency has been increased.

In embodiments, the connecting duct may thus consist of several segments, e.g., of a first portion having a small flow resistance, and of a second portion having a large flow resistance with regard to the liquid.

In the embodiments described, the different flow resistance/volume products are implemented essentially by different flow resistances of the venting ducts. In alternative embodiments, the different products may alternatively or additionally be achieved by different volumes. For example, the venting ducts may have essentially the same flow resistance, and the volume of the one chamber may be at least four times the volume of the other chamber. In alternative embodiments, both flow resistances and chamber volumes may be different so as to obtain a corresponding ratio between the products.

In embodiments, several inlet chambers may be provided with are fluidically connected to the outlet chamber via connecting ducts. The connecting ducts may lead into a common connecting duct with leads into the outlet chamber. The inlet chambers, the connecting ducts and the outlet chamber may be configured to achieve the described effects with regard to the several inlet chambers and the outlet chamber.

Embodiments of the invention may be applied, in particular, in the field of centrifugal microfluidics, which is about processing of liquids within the femtoliter to milliliter ranges. Accordingly, the fluidic structures may have suitable dimensions within the micrometer range for handling corresponding volumes of liquid. In particular, embodiments of the invention may be applied to centrifugal-microfluidic systems.

Whenever the expression "radial" is used herein, what is meant is radial in relation to the center of rotation R about which a body of rotation is rotatable. Thus, within the centrifugal field, a radial direction away from the center of rotation is radially descending, and a radial direction toward the center of rotation is radially ascending. A fluid duct whose beginning is located closer to the center of rotation than is its end is therefore radially descending, whereas a fluid duct whose beginning is located further away from the center of rotation than is its end is radially ascending. A duct comprising a radially ascending portion thus comprises directional components which are radially ascending and/or extend radially inward. It is clear that such a duct need not extend exactly along a radial line but may extend at an angle to the radial line or in a curved manner.

Generally, in embodiments of the invention, different flow resistances (fluidic resistances, hydraulic resistances) of respective fluid ducts may be achieved by means of different flow cross sections. In alternative embodiments, different flow resistances may also be achieved by other means, e.g., different duct lengths, obstacles integrated into the ducts, and the like. If a comparison between flow resistances is indicated, one may assume that what is meant is the flow resistance toward the same fluid, unless indicated otherwise. If mention is made herein of a fluid duct, what is meant is a structure whose length dimension from a fluid inlet to a fluid outlet is larger, e.g., more than 5 times or more than 10 times larger, than the dimension or dimensions defining the flow cross section. Thus, a fluid duct may have a flow resistance to fluid flowing through same from the fluid inlet to the fluid outlet. In contrast, a fluid chamber herein is a chamber which may have such dimensions that no relevant flow resistance occurs therein.

The expression liquid and/or liquid phase as is used herein is to also include liquids which contain solid constituents such as suspensions and biological samples, as will be apparent to those skilled in the art.

With regard to FIGS. 6 and 7, examples of centrifugal-microfluidic systems wherein the invention may be used will now be described.

Figure 6:
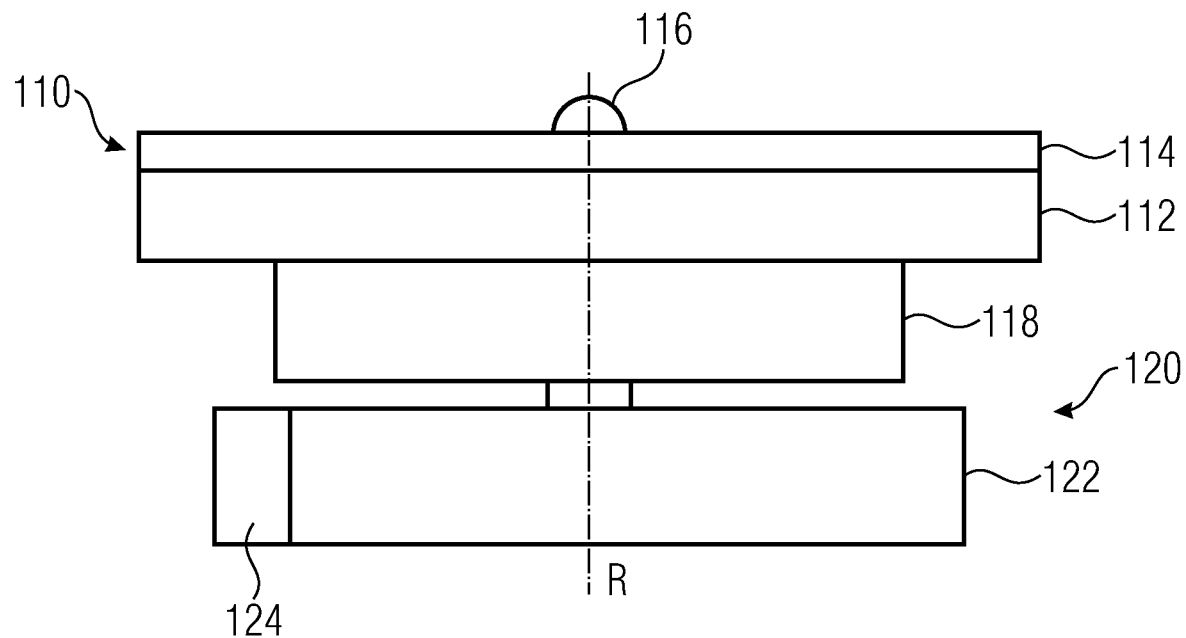
FIGS. 6 and 7 show schematic side views for illustrating embodiments of liquid handling devices with fluid-dynamic flow control.

FIG. 6 shows a device having a fluidic module 110 in the form of a body of rotation comprising a substrate 112 and a cover 114. The substrate 112 and the cover 114 may be circular in a top view and have a central opening via which the body of rotation 110 may be mounted, by means of a common attachment means 116, to a rotating part 118 of a drive device 120. The rotating part 118 is pivoted on a stationary part 122 of the drive device 120. The drive device 120 may be a conventional centrifuge, which may have an adjustable rotational speed, or a CD or DVD drive, for example. A control means 124 may be provided which is configured to control the drive device 120 to subject the body of rotation 110 to a rotation or to rotations of different rotational frequencies. As will be obvious to persons skilled in the art, the control means 124 may be implemented, e.g., by a computing means programmed accordingly or by an application-specific integrated circuit. The control means 124 may further be configured to control, upon manual entries made by a user, the drive device 120 to cause the useful rotations of the body of rotation. In any case, the control means 124 may be configured to control the drive device 120 to subject the body of rotation to the useful rotation so as to implement embodiments of the invention as are described herein. As the drive device 120, a conventional centrifuge having only one direction of rotation may be used.

The body of rotation 110 comprises the fluidic structures that may be used. The fluidic structures that may be used may be formed by means of cavities and ducts within the cover 114, within the substrate 112 or within the substrate 112 and the cover 114. In embodiments, e.g., fluidic structures may be formed within the substrate 112, whereas fill-in openings and venting openings are formed within the cover 114. In embodiments, the structured substrate (including fill-in openings and venting openings) is arranged at the top, and the cover is arranged at the bottom.

Figure 7:
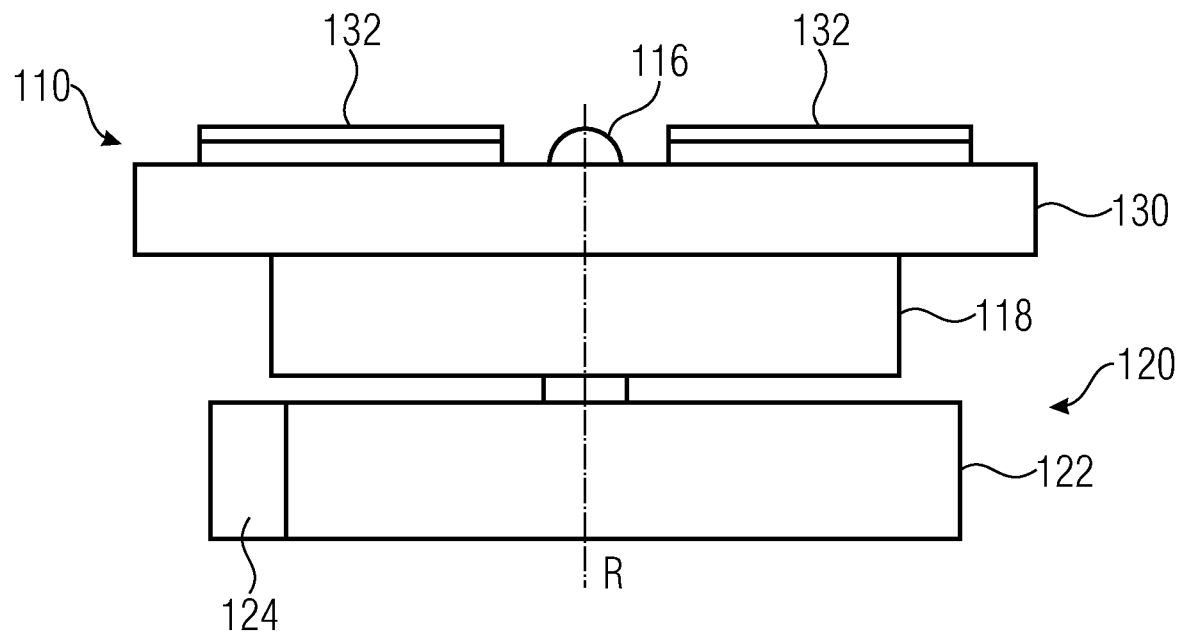

In an alternative embodiment shown in FIG. 7, fluidic modules 132 are inserted into a rotor 130 and form, together with the rotor 130, the body of rotation 110. The fluidic modules 132 may each comprise a substrate and a cover which in turn may have corresponding fluidic structures formed therein. The body of rotation 110 formed by the rotor 130 and the fluidic modules 132 in turn may be subjected to a rotation by means of a drive device 120 controlled by the control means 124.

In FIGS. 5 and 6, the center of rotation about which the fluidic module and/or the body of rotation is/are rotatable, in turn is designated by R.

In embodiments of the invention, the fluidic module and/or the body of rotation, which comprises the fluidic structures, may be formed of any suitable material, e.g., a plastic such as PMMA (polymethyl methacrylate), PC (polycarbonate), PVC (polyvinyl chloride), or PDMS (polydimethyl siloxane), glass or the like. The body of rotation 110 may be regarded as a centrifugal-microfluidic platform. In advantageous embodiments, the fluidic module and/or the body of rotation may be formed of a thermoplastic such as PP (polypropylene), PC, COP (cyclic olefin polymer), COC (cyclo olefin copolymer), or PS (polystyrene).

Embodiments of the invention thus enable implementation of a switching mechanism which may be operated at a constant rotational frequency. Activation of the switch may be set by selecting the fluidic resistance, the viscosity of the fluids, the heating/cooling rate and by means of the rotational frequency.

In embodiments of the invention, the ratio between the flow resistance/volume products may be determined in accordance with the respective resistances for the same fluid in each case, e.g., air.

In embodiments, no surface modification of the test carrier is necessary. In addition to switching, the principle of dynamic venting may also be used for a delay function. For example, a flow of a first fluid having a high viscosity (such as water) into a chamber having venting for a second fluid of low viscosity (e.g., air) may be influenced by the fluidic resistance of the venting ducts; a flow of the first fluid into the chamber may be minimized. The volume flows may be set substantially more accurately at low rotational speeds, and for the fluid having a high level of viscosity, there is no risk of bubbles or plaque forming within the fluidic duct. The underlying principle is applicable both to highly wetting and to non-wetting liquids. The underlying principle may be used by suitably selecting the fluidic resistances within the system and for higher-viscosity liquids.

In contrast to capillary siphon valves, a switching principle, in accordance with the invention, therefore is not based on capillary pressures which dominate centrifugal pressures when below a switching frequency. Thus, the switching principle is applicable not only with liquid material combinations where a contact angle <90 results, so that such a contact angle <90 need not be generated by adding additives to the liquid or by means of surface coating, which possibly is not compatible with the (biochemical) processes to be integrated, and/or which possibly significantly increases the structural design and connection technology costs of the system. In addition, embodiments of the invention require no variable rotational speed which possibly is not enabled by all processing devices.

In contrast to centrifugal-pneumatic valves, the switching principle requires, in accordance with the invention, no terminal, closed air volume, so that integration as a last switching operation within a fluidic network is not necessary. In addition, with centrifugal-pneumatic valves, variable rotational speeds are used, which is not necessary with the invention.

In contrast to centrifugal-pneumatic valves comprising dissolvable membranes, with the invention neither variable rotational speeds are required, nor must the liquid be suitable for dissolving a water-soluble membrane. Thus, one may prevent possible solution products of the membrane from being mixed with the liquid. Increased structural design and connection technology costs as accrue with such dissolvable membranes so as not to be dependent on a terminal chamber may be avoided in embodiments of the invention.

With hydraulic valves as are described, e.g., in [4], a closed air volume is used, so that the valve cannot be freely integrated into fluidic networks, which with the invention is not required. In addition, according to [4] the switch is not robust in terms of high centrifugal pressures, which may possibly be useful in the application (e.g., blood plasma separation).

Also as compared to time-controlled valves as are described at [5], a clearly reduced amount of expenditure is possible with the invention. Integration of a paper strip and of two dissolvable membranes per valve, which results in a large amount of structural design and connection technology expenditure, is not required. Even though with such time-controlled valves, the switching principle is functional at a constant rotational speed, the switching times are defined by the dimensioning of the paper strip and by the dissolution behavior of the membranes and permit no subsequent adaptation by, e.g., changing the temperature profile. In addition, the switching principle involves an additional auxiliary liquid, which may either be stored in advance or added by the user. With the invention, such measures are not necessary.

Also with water meter valves (see [6]), the switching principle involves an additional auxiliary liquid which may either be stored in advance or added by the user. Even though operation at a constant rotational speed in enabled, the frequency protocol, liquids and geometries may be very finely tuned so that both the auxiliary liquid is not drawn into the venting ducts and that the venting ducts will not completely dewet as soon as the filling level falls below the venting opening. The switch may be employed merely with closed air volumes, so that it cannot be freely integrated into fluidic networks. Also as compared to such valves, embodiments of the invention involve clearly less expenditure and enable more flexibility of use.

With vacuum/compression valves as are described at [7], the switching principle involves a manufacturing process wherein molten paraffin wax may be positioned with high precision and cured, and wherein the disk may then be further processed, so that the costs of structural design and connection technology are increased considerably. In addition, switch actuation involves a local source of heating which may melt the paraffin wax (active switch). This increases the complexity of the processing device. Even though the functionality is a given at a constant rotational speed, the switch is not robust toward high centrifugal pressures which may possibly be used in the application (e.g., blood plasma separation). In addition, the switch may be employed merely with closed air volumes, so that it cannot be freely integrated into fluidic networks. Also as compared to such valves, embodiments of the invention involve clearly less expenditure and enable more flexibility of use.

With thermo-pneumatic valves as are known from [8], the switching principle involves a large separate air volume which occupies valuable space on the limited disk. In addition, a closed air volume may be used so that the valve cannot be freely integrated into fluidic networks. The processing device may permit local heating, which renders it more complex and expensive. Also as compared to such valves, embodiments of the invention involve clearly less expenditure and enable more flexibility of use.

Typical values of geometries for the fluidic structures will be briefly indicated below.

In a typical implementation of the embodiment shown in FIGS. 2 and 3, the outlet chamber venting duct may have a cross section of 100 µm times 100 µm at a length of 30 mm. The volume of the outlet chamber may amount to 900 µl, the volume of the inlet chamber may amount to 500 µl. The connecting duct may have a cross section of 300 µm times 300 µm at a length of 10 mm. The inlet chamber venting duct may have a cross section of 600 µm times 600 µm at a length of 30 mm. The relevant amount of the pressure difference $|p1(t)-p2(t)|$ may be larger than 5 mbar.

In a typical implementation of the embodiment shown in FIGS. 4a and 4b, the outlet chamber venting duct may have a cross section of 50 µm times 50 µm at a length of 30 mm. The volume of the outlet chamber may amount to 900 µl, the volume of the inlet chamber may amount to 500 µl. The connecting duct may have a cross section of 300 µm times 300 µm at a length of 10 mm. The inlet chamber venting duct may have a cross section of 600 µm times 600 µm at a length of 30 mm.

Embodiments thus provide a switching mechanism determined by the dimensions of the chambers and by the fluid resistances of the ducts by a change in temperature. Thus, a switching mechanism, triggered by the dynamics of equalization processes of fluids, may be implemented due to a local or global change in volume and/or change in pressure at a constant rotational frequency. In addition, in one embodiment, a flowrate of a first fluid from an inlet chamber into an outlet chamber may be influenced by the selection of the volumes of the chambers and by the fluid resistances so as to implement a delay switch.

Even though features of the invention were described by means of device features or method features in each case, it will be apparent to persons skilled in the art that corresponding features may also be part of a method or of a device, respectively. Thus, the device may be configured in each case to perform corresponding method steps, and the respective functionality of the device may represent corresponding method steps.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

LIST OF LITERATURE

[1] Schembri, C. T.; Burd, T. L.; Kopf-Sill, A. R.; Shea, L. R.; Braynin, B. (1995): Centrifugation and capillarity integrated into a multiple analyte whole blood analyser; in: The Journal of Automatic Chemistry 17 (3), pp. 99-104. DOI: 10.1155/S1463924695000174
[2] Mark, Daniel; Metz, Tobias; Haeberle, Stefan; Lutz, Sascha; Ducree, Jens; Zengerle, Roland; Stetten, Felix von (2009): Centrifugo-pneumatic valve for metering of highly wetting liquids on centrifugal microfluidic platforms; in: Lab Chip 9 (24), p. 3599. DOI: 10.1039/b914415c
[3] Gorkin I I I, Robert; Nwankire, Charles E.; Gaughran, Jennifer; Zhang, Xin; Donohoe, Gerard G.; Rook, Martha et al. (2012): Centrifugo-pneumatic valving utilizing dissolvable films; in: Lab Chip 12 (16), p. 2894. DOI: 10.1039/C2LC20973J
[4] Siegrist, Jonathan; Gorkin, Robert; Bastien, Martine; Stewart, Gale; Peytavi, Regis; Kido, Horacio et al. (2010): Validation of a centrifugal microfluidic sample lysis and homogenization platform for nucleic acid extraction with clinical samples; in: Lab Chip 10 (3), p. 363. DOI: 10.1039/b913219h
[5] Kinahan, D. J.; Kearney, S. M.; Glynn, M. T.; Ducree, Jens (2013): IMBIBITION-MODULATED EVENT-TRIGGERING OF CENTRIFUGO-PNEUMATIC CASCADING FOR MULTI-STAGE DILUTION SERIES
[6] Ukita, Yoshiaki; Ishizawa, Masaki; Takamura, Yuzuru; Utsumi, Yuichi (2012): INTERNALLY TRIGGERD MULTISTEP FLOW SEQUENCERS USING CLEPSYDRA
[7] Al-Faqheri, Wisam; Ibrahim, Fatimah; Thio, Tzer Hwai Gilbert; Moebius, Jacob; Joseph, Karunan; Arof, Hamzah et al. (2013): Vacuum/Compression Valving (VCV) Using Parrafin-Wax on a Centrifugal Microfluidic CD Platform; in: PLoS ONE 8 (3), p. e58523. DOI: 10.1371/journal.pone.0058523
[8] Abi-Samra, Kameel; Clime, Liviu; Kong, Ling; Gorkin, Robert; Kim, Tae-Hyeong; Cho, Yoon-Kyoung; Madou, Marc (2011): Thermo-pneumatic pumping in centrifugal microfluidic platforms; in: Microfluid Nanofluid 11 (5), pp. 643-652. DOI: 10.1007/s10404-011-0830-5
[9] US 2008/0149190 A1
[10] WO 2013/045631 A1
[11] M. Focke; F. Stumpf; G. Roth; R. Zengerle; F. von Stetten: Centrifugal microfluidic system for primary amplification and secondary real-time PCR; in: Lab Chip, 2010, 10, pp. 3210-3212
[12] M. Richter, P. Woias, D. Weiβ, Microducts for applications in liquid dosing and flow-rate measurement, Sensors and Actuators A: Physical 62 (1997) 480-483.

The invention claimed is:
1. Fluid handling method comprising:
providing a fluid handling device comprising:
microfluidic structures comprising at least one inlet chamber, one outlet chamber, and a connecting duct which fluidically connects the inlet chamber to the outlet chamber,
wherein in an initial state, the inlet chamber is completely filled with at least a liquid or partly filled with at least a liquid and partly filled with a compressible medium, and the outlet chamber is at least partly filled with the compressible medium,
wherein one of the inlet chamber and the outlet chamber comprises a venting duct so that a flow resistance/volume product of venting of said chamber for the compressible medium amounts to at least

$$6700 \frac{N \cdot s}{m^2},$$

the other of the inlet chamber and of the outlet chamber being vented,
wherein the respective flow resistance/volume product is defined by the product resulting from the volume of the respective chamber and a fluidic resistance $R_{fl}$ of the respective venting duct, comprising $$R_{fl} = C_{geometry} \cdot \frac{\eta l}{A^2}$$

wherein $C_{geometry}$ is a geometry-dependent factor, $\eta$ is the viscosity of the compressible medium, l is the length of the respective venting duct, and A is the cross sectional area of the respective venting duct; and
starting from the initial state, actuating the microfluidic structures by effecting a temperature change of the compressible medium or by increasing a rotational frequency at which the microfluidic structures are rotated so as to cause, due to different pressure equalization rates of the inlet chamber and of the outlet chamber, a pressure difference of at least 30 Pa between the compressible medium within the inlet chamber and the compressible medium within the outlet chamber so as to thereby switch a valve device implemented into the connecting duct, such that liquid gets from the inlet chamber into the outlet chamber, or so as to thereby temporarily counteract a flow, caused by the actuating, from the inlet chamber into the outlet chamber.
2. Fluid handling method as claimed in claim 1, wherein the fluid handling device is provided such that the flow resistance/volume product is a first flow resistance/volume product, the other of the inlet chamber and of the outlet chamber comprising a venting duct and, thus, a second flow resistance/volume product of the venting of said other chamber for the compressible medium, the first flow resistance/volume product being at least four times larger than the second flow resistance/volume product.
3. Fluid handling method as claimed in claim 1, wherein the fluid handling device is provided such that the microfluidic structures are formed within a fluidic module which represents a body of rotation or may be inserted into a body of rotation, wherein the fluid handling device further comprises a drive unit configured to subject the fluidic module and, thus, the microfluidic structures to rotation.

4. Fluid handling device as claimed in claim 1, wherein the fluid handling device is provided such that the connecting duct comprises a siphon or a capillary valve.

5. Method as claimed in claim 1, wherein the chamber whose flow resistance/volume product of the venting of said chamber for the compressible medium amounts to at least $$6700\frac{N \cdot s}{m^2}$$

is the inlet chamber, wherein said actuating causes a pressure increase of the compressible medium so that due to a delay in pressure equalization within the inlet chamber, an excess pressure of at least 30 Pa in the compressible medium within the inlet chamber is temporarily caused as compared to the compressible medium within the outlet chamber.

6. Method as claimed in claim 5, wherein said actuating comprises heating of the compressible medium at a heating rate of ≥0.1 K/s.

7. Method as claimed in claim 6, wherein the heating of the compressible medium comprises heating the ambient air.

8. Method as claimed in claim 6, wherein the heating of the compressible medium is caused locally within the inlet chamber and/or the outlet chamber.

9. Method as claimed in claim 1, wherein the chamber whose flow resistance/volume product of the venting of said chamber for the compressible medium amounts to at least $$6700\frac{N \cdot s}{m^2}$$

is the outlet chamber, wherein said actuating causes a pressure decrease of the compressible medium so that due to a delay in pressure equalization within the outlet chamber, a negative pressure of at least 30 Pa in the compressible medium within the outlet chamber is temporarily caused as compared to the compressible medium within the inlet chamber.

10. Method as claimed in claim 9, wherein said actuating comprises cooling of the compressible medium at a cooling rate of ≥0.1 K/s.

11. Method as claimed in claim 10, wherein the cooling of the compressible medium is caused by cooling the ambient air.

12. Method as claimed in claim 10, wherein the cooling of the compressible medium is caused locally within the inlet chamber and/or the outlet chamber.

13. Method as claimed in claim 1, wherein the chamber whose flow resistance/volume product of the venting of said chamber for the compressible medium amounts to at least $$6700\frac{N \cdot s}{m^2}$$

is the outlet chamber, and wherein the pressure difference is caused by mechanical compression of the compressible medium within the outlet chamber.

14. Method as claimed in claim 13, wherein said actuating comprises subjecting the liquid within the inlet chamber to a force by which the liquid is driven into the connecting duct, wherein an increase in pressure in the compressible medium within the outlet chamber is caused by mechanical compression of the compressible medium within the outlet chamber if the outlet chamber is the chamber whose flow resistance/volume product of the venting of said chamber for the compressible medium amounts to at least $$6700\frac{N \cdot s}{m^2},$$

or wherein a reduction in pressure in the compressible medium within the inlet chamber is caused by mechanical decompression of the compressible medium within the inlet chamber if the inlet chamber is the one of the inlet chamber and the outlet chamber.

15. Fluid handling method as claimed in claim 14, wherein the subjecting the liquid within the inlet chamber to a force takes place by increasing a rotational frequency at which the microfluidic structures are rotated.

16. Method as claimed in claim 1, wherein the chamber whose flow resistance/volume product of the venting of said chamber for the compressible medium amounts to at least $$6700\frac{N \cdot s}{m^2}$$

is the inlet chamber, and wherein the pressure difference is caused by mechanical decompression of the compressible medium within the inlet chamber.

\* \* \* \* \*